United States Patent [19]

Derschmidt

[11] 4,182,597

[45] Jan. 8, 1980

[54] HELICOPTER ROTOR HEAD

[75] Inventor: Hans Derschmidt, Putzbrunn, Fed. Rep. of Germany

[73] Assignee: Messerschmitt-Boelkow-Blohm GmbH, Munich, Fed. Rep. of Germany

[21] Appl. No.: 838,677

[22] Filed: Oct. 3, 1977

[30] Foreign Application Priority Data

Oct. 7, 1976 [DE] Fed. Rep. of Germany ....... 2645174

[51] Int. Cl.² .............................................. B64C 27/38
[52] U.S. Cl. .................................. 416/134 A; 416/141
[58] Field of Search ................. 416/134 A, 141, 23 A, 416/241 A, 138 A

[56] References Cited

U.S. PATENT DOCUMENTS

| 3,384,185 | 5/1968 | Fernandez | 416/230 A X |
| 3,606,575 | 9/1971 | Lermusiaux | 416/138 A |
| 3,669,566 | 6/1972 | Bourquardez et al. | 416/141 X |
| 3,874,815 | 4/1975 | Baskin | 416/141 X |
| 3,880,551 | 4/1975 | Kisovec | 416/141 X |
| 3,999,887 | 12/1976 | McGuire | 416/141 X |
| 4,008,980 | 2/1977 | Noehren et al. | 416/141 X |
| 4,047,839 | 9/1977 | Ferris et al. | 416/141 X |

*Primary Examiner*—Everette A. Powell, Jr.
*Attorney, Agent, or Firm*—W. G. Fasse; W. W. Roberts

[57] ABSTRACT

The present rotor head for a helicopter is free of flapping hinges and free of drag or lagging hinges. The rotor blades or wings are connected to the rotor head by a plurality of connecting plates which are flexible to bending moments. These plates are inserted into the blade roots of the helicopter wings and connected to the rotor head proper. The planes defined by these connecting plates intersect in the axis of the rotor blades or wings.

14 Claims, 12 Drawing Figures

HELICOPTER ROTOR HEAD

BACKGROUND OF THE INVENTION

The present invention relates to a helicopter rotor head. More specifically, the invention relates to a helicopter rotor head which is free of flapping hinges as well as free of drag or lagging hinges. The rotor blades are supported by a flexible clamping or securing device.

Prior art hingeless rotors require at least two bearings for each blade or wing at the rotor head for taking up the forces and bending moments. Such prior art bearings have a compact structure which has a certain vulnerability, especially if used in military purpose helicopters.

Besides, the operating condition of these bearings cannot be easily ascertained without disassembling the bearing so that they require a periodically recurring maintenance effort.

Furthermore, where the rotor blades and the rotor head are made of fiber reinforced compound materials, it is necessary that the forces to be taken up by the bearing are introduced into the bearing by special hardware connected to the rotor blade, as well as to the rotor head. This type of structure therefore results in a higher manufacturing expense, as well as in additional structural weight. The structure disclosed in U.S. Pat. No. 3,880,551 suggests for avoiding the disadvantages of blade connections using conventional bearings and hardware, to interconnect two oppositely arranged rotor blades or wings by means of a carrier band which is clamped between transversely extending flexible cross bars. The carrier band, as well as the cross bars, are made of flexible glass fiber reinforced synthetic material. However, this type of structure is apparently not suitable for taking up the forces and moments which occur at the main rotor head of a helicopter because this known structure is intended for use, especially in connection with tail rotors in a helicopter.

OBJECTS OF THE INVENTION

In view of the above it is the aim of the invention to achieve the following objects, singly or in combination:

to secure the blades or wings of a helicopter rotor, especially a main rotor to the rotor head in a flexible manner for avoiding flapping hinges, as well as lagging hinges, whereby simultaneously to avoid bearings having a vulnerable structure;

to avoid special hardware for the rotor head and bearing structure while simultaneously assuring that the forces and moments occurring in a drive rotor of a helicopter are safely taken up;

to construct a rotor head in such a manner that elastic or flexible plates provide a safe radial as well as axial bearing support for the blades or wings while simultaneously permitting the angular movements of the blades or wings and assuring a proper take-up of the occurring moments, such as bending moments and moments resulting from the lagging movement of the wings or blades;

to minimize the weight of a rotor head and bearing structure while simultaneously reducing the vulnerability of such a structure relative to external mechanical influences; and to provide a common bridge for two pairs of helicopter blades at the rotor head.

SUMMARY OF THE INVENTION

According to the invention there is provided a rotor head for the support of the helicopter blades with a flexible clamping or securing device, wherein the rotor blades are interconnected with the rotor head by means of flexible, plane plates inserted into the rotor blade roots and secured thereto in such a manner that the planes defined by these plates intersect in the rotor blade axes, whereby flapping hinges as well as lagging hinges are avoided. Preferably, the plates have a substantial length in the direction of the rotor blade axis while being relatively thin in the direction perpendicularly to the plane of the plate. It has been found to be advantageous to provide four plates for each rotor blade root. Preferably, the angle between any one of the four plates and the rotor blade plane is smaller than the angle between any one of these plates and a plane extending through the rotational axis of the rotor and the rotor blade axis.

According to a practical embodiment of the invention, the plates are connected to the rotor head by means of two bars arranged laterally and parallel relative to the rotor blade axis. The connecting bars are stiffened in an area toward the rotor head center by means of bridge elements. The opposite ends of the bars are spaced by spacer members and the bridge elements as well as the spacer members are secured to the plates.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 2:
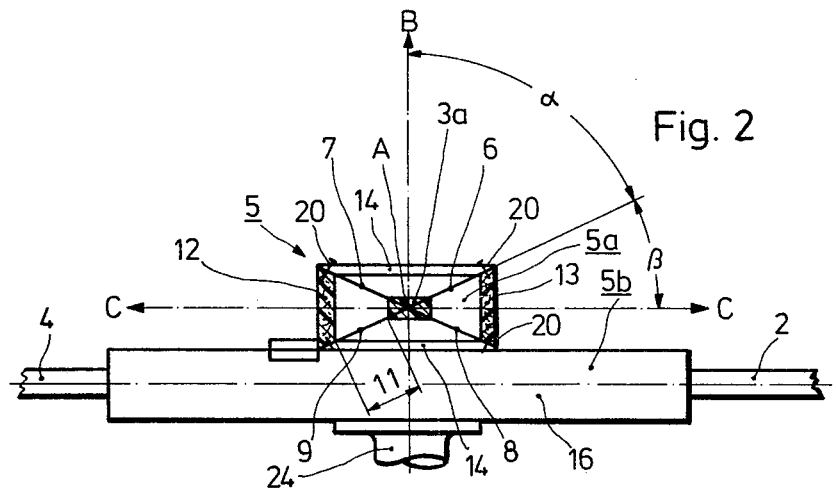
FIG. 2 is a sectional view through the arrangement of FIG. 1 along the section line 2—2.
Figure 1:
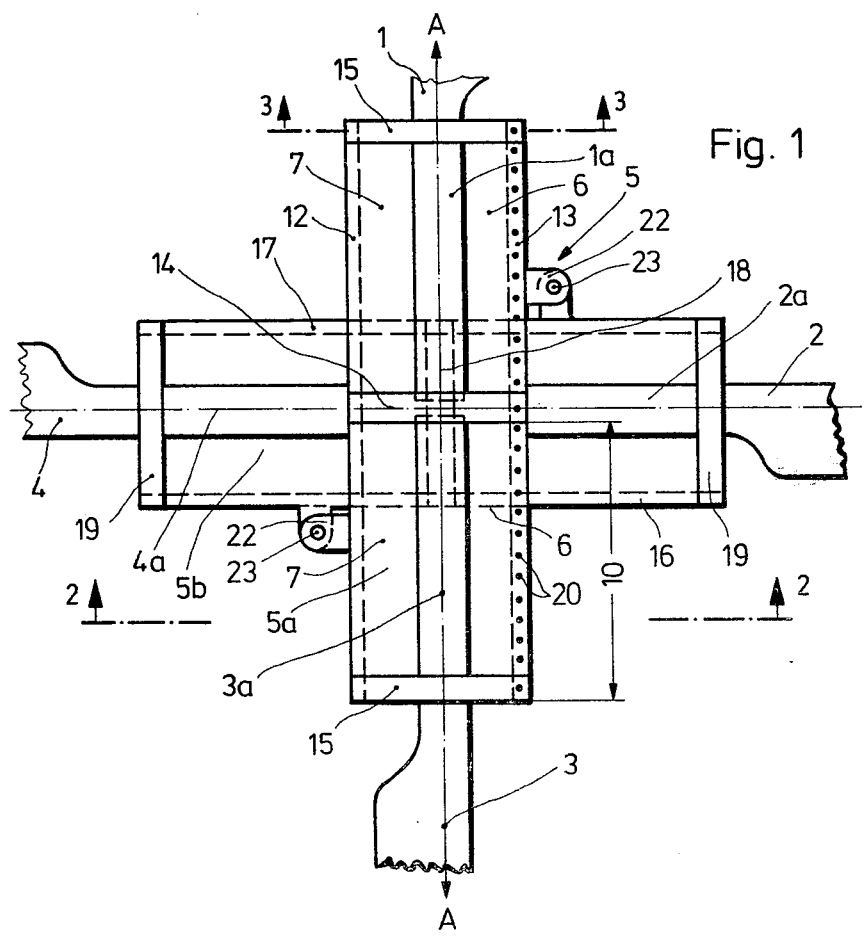
FIG. 1 is a top plan view of a first embodiment according to the invention, comprising two pairs of rotor blades arranged one above the other.

The example embodiments of the invention to be described in the following context relate to a rotor or rotor head interconnecting four rotor blades without any flapping hinges and without any lead-lag hinges. FIGS. 1 and 2 illustrate a first example embodiment, wherein the four rotor blades 1, 2, 3, and 4 merge with their respective blade or wing roots 1a, 2a, 3a, and 4a in a rotor head 5. The arrangement is such, that the rotor blades 1 and 3 are located in a plane above the plane defined by the rotor blades 2 and 4. Each of the four rotor blades is secured or clamped to four plane plates 6, 7, 8, and 9 in such a manner that the planes defined by these plates 6, 7, 8, and 9, intersect in the rotor blade axis "A". The point of intersection is shown in FIG. 2 where the blade axis A extends into the plane of the drawing sheet at a right angle. The plates 6 to 9 have a length 10 in the direction of the rotor blade axis A which is larger than their width or thickness 11 perpendicularly to the blade axis A. Further, the plates 6, 7, 8, and 9 are arranged in such a manner that the angle α defined between the plane extending through the rotational axis B of the rotor head and the plane of a plate is larger than the angle β defined between the plane of the plate and a plane extending through the rotor blade plane as illustrated in FIG. 2. The plates 6, 7, 8, and 9 in the upper portion or plane of the rotor head 5 interconnecting rotor blade roots 1a and 3a are in turn interconnected along their longitudinal edges 10 extending opposite the rotor blades proper, by means of bars 12 and 13. The plates 6 and 7 on the one hand and the plates 8 and 9 on the other hand are further interconnected by bridge elements 14. The ends of the plates are in turn interconnected by spacer members 15. The just described structure results in a securing box 5a for the plates 6, 7, 8, and 9. Similarly, the plates 6 to 9 secured or clamped to the rotor blade roots 2a and 4a are also connected by bars 16 and 17, as well as bridge elements 18 and spacer members 19 to form a further securing box 5b as illustrated in FIGS. 1 and 2.

The plates 6, 7, 8, and 9, the bars 12 and 13, as well as the bridge elements 14 and the spacer members 15, are interconnected by connection elements 20, preferably screws indicated by dots 20, for example, in FIG. 1. However, FIG. 1 merely shows the screws 20 used for connecting the plate 6, the bridge elements 14 and the spacer members 15. Brackets 22 are secured to all bars 12, 13, 16, and 17 in such a position that bolts 23 extending through respective holes in the brackets 22, interconnect the securing boxes 5a and 5b as shown in FIG. 1. Upon removal of the bolts 23 it is possible to rotate the securing box 5a into alignment with the securing box 5b, whereby the rotor blades or wings may also be aligned with each other for transport purposes. The drive shaft 24 is indicated below the securing box 5b for rotating the rotor head 5.

Figure 3:
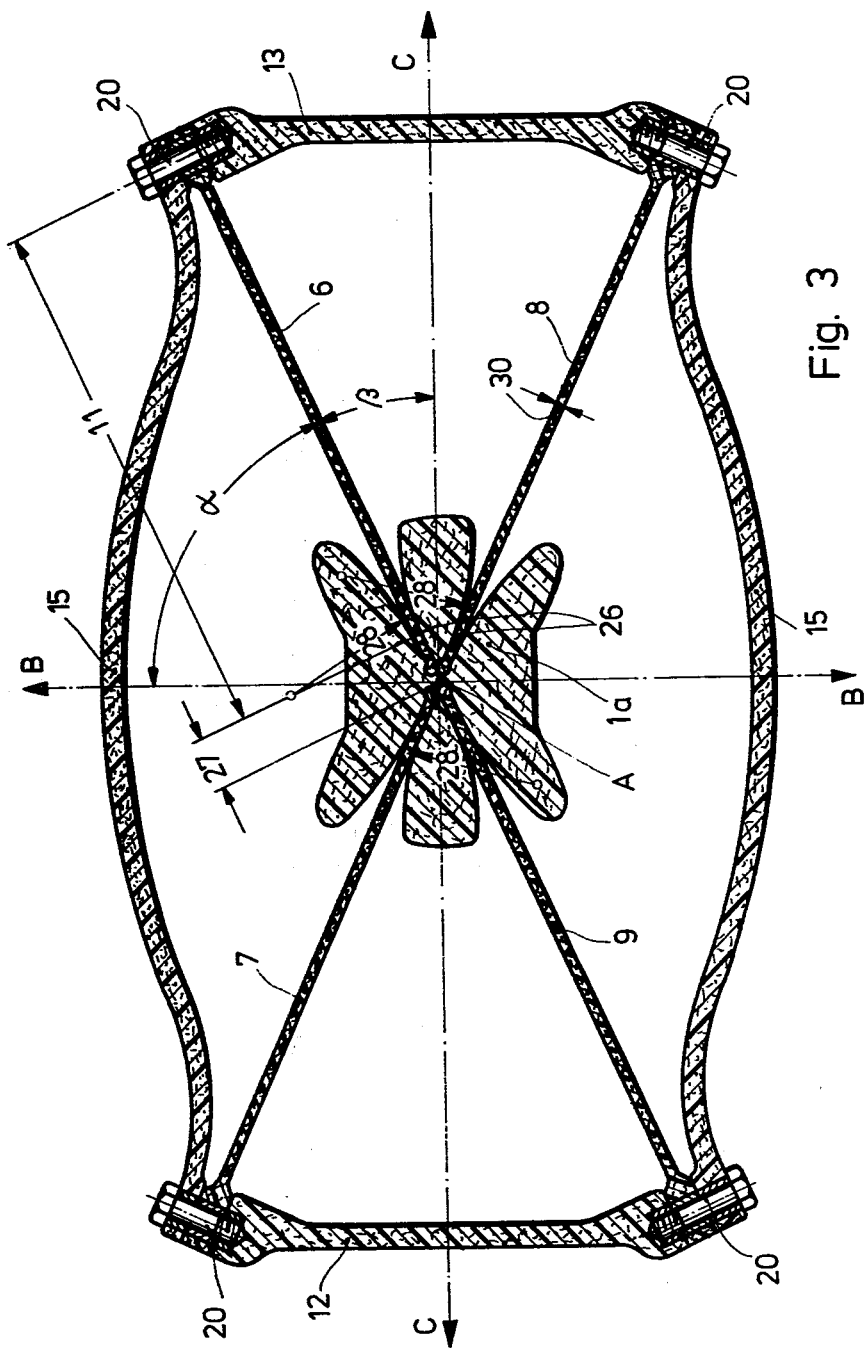
FIG. 3 is a section, on an enlarged scale, along the section line 3—3 in FIG. 1.

FIG. 3 illustrates on an enlarged scale the securing or clamping of the plates 6, 7, 8, and 9 to the blade roots 1a. FIG. 3 further shows in more detail the connection of the plates 6 to 9 to the securing box 5a. The plates 6 to 9 which intersect at the rotor blade axis A are clamped in slots 26 of the blade root 1a. The clamped portions 27 of the plates account only for a fraction of the entire blade width 11, extending from the line where the clamping ends, to the corner of the securing box or, more specifically to the axis of the respective screws 20.

The slots 26 which receive one edge of the respective plate merge into circular curves 28, whereby subjecting the plates to a sharp bend is avoided. The plates 6 to 9 are reinforced in the areas where the plates are connected to the bars 12 and 13 as well as in the area where the plates are connected to the spacer members 15 for a better take up and transmission of the forces at the connecting areas.

Figure 4:
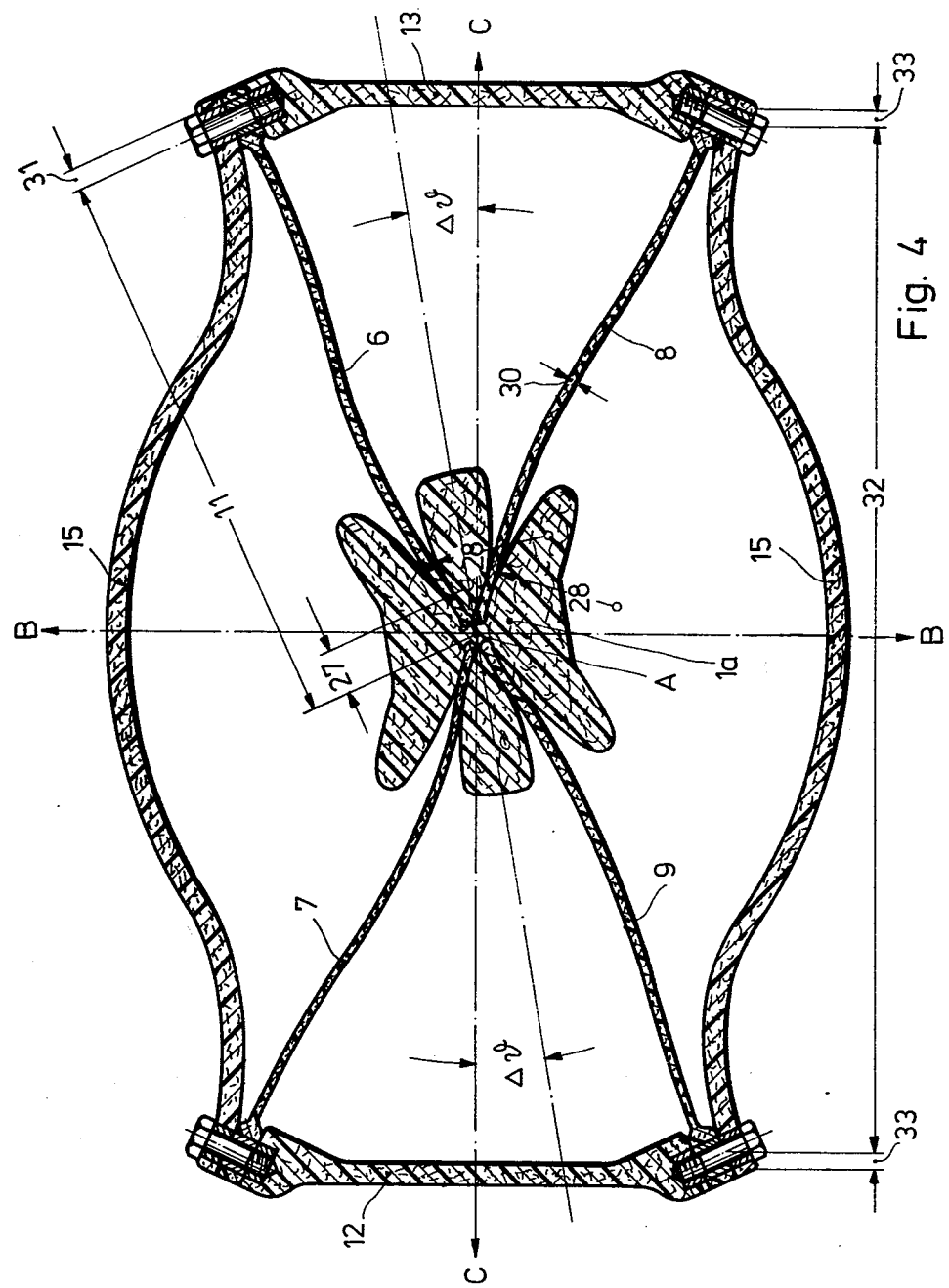
FIG. 4 is a section corresponding to that of FIG. 3, however, illustrating the rotor blade in an elastically deformed condition.

The cooperation of the elements of the rotor head 5 in response to moments effective around the rotor blade axis A is illustrated in FIG. 4. The rotor blade root 1a is able, in response to such moments, to twist about the longitudinal rotor blade axis A within the range defined by the angle $\Delta\theta$ relative to the plane C—C of the rotor head. For illustration purposes the angular twisting of the rotor blade root is exaggerated in FIG. 4 to show how the flexible plates 6 to 9 are elastically deformed into a bending deformation having somewhat an S-configuration. Due to the fact that the plates 6, 7, 8, and 9 have a relatively large free bending length 11 as compared to their thickness 30, the just described deformation causes relatively small restoring torque moments. The S-configuration resulting from the bending deformation causes a small length reduction 31 as compared to the width 11 of the respective plates. As a result, the tension stress caused thereby is also small relative to the permissible or rated tension strength of the material of which the plates 6, 7, 8, and 9 are made. In addition, the spacer members 15 are so constructed that they may be deformed in their length 32 by relatively small forces. The combination of the just described features has the advantage that the restoring torque moments which occur at the bars 12 and 13 as a result of the twisting of the rotor blade 1 and which are caused due to the length reduction 33, are only small.

Figure 5:
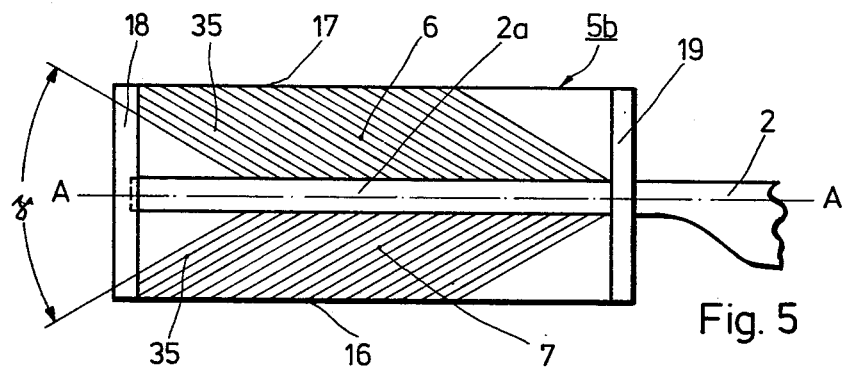
FIG. 5 is an illustration of the fiber arrangement in the plates which interconnect two rotors and which are made of fiber reinforced synthetic material.
Figure 6:
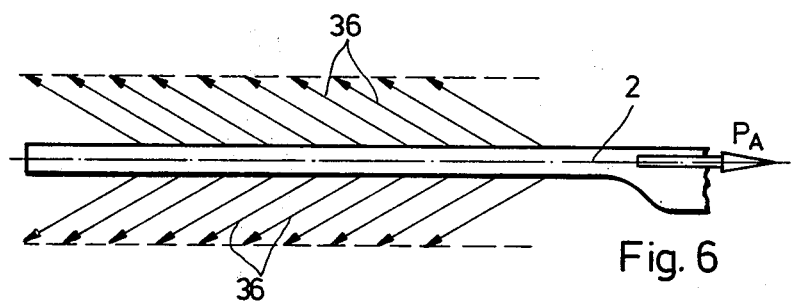
FIG. 6 illustrates in a schematic manner, the distribution of forces in the plates resulting from substantially axially effective tension forces.
Figure 7:
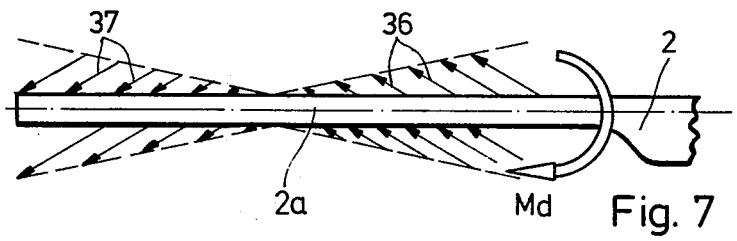
FIG. 7 illustrates the force distribution resulting from the flapping bending moments and the lagging bending moments.
Figure 8:
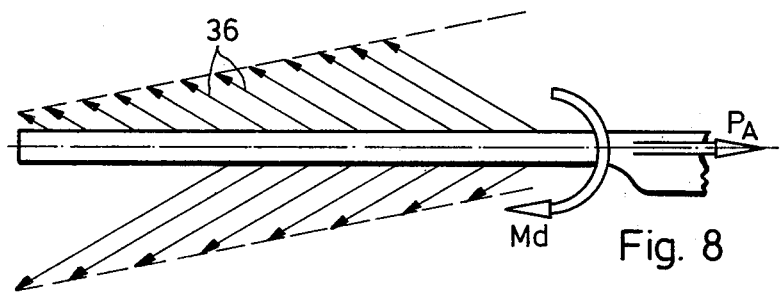
FIG. 8 illustrates the resulting force distribution when the axially effective tension forces and the bending moments of FIGS. 6 and 7 are superimposed in the same blade.

All components of the rotor head are suitably made of fiber reinforced compound materials, especially fiber reinforced synthetic materials. Experience has shown that this type of material has proved itself greatly to take up the loads occurring in a hingeless rotor. The reinforcing fibers used for this purpose may depend on the type of load involved. Glass, especially silica glass has been found to be satisfactory. However, carbon fibers or synthetic fibers, for example, known under the trade name "KEVLAR" may also be used. The matrix in which the fiber materials are embedded, is preferably of the epoxy resin type. FIG. 5 illustrates in a somewhat simplified partial view of the securing box 5b and the bearing support of the rotor blade 2, a preferred arrangement of the reinforcing fibers 35 in the plates 6 and 7. The reinforcing fibers 35 form an acute angle γ relative to the longitudinal axis A of the rotor blade 2. Referring to FIGS. 6, 7, and 8, the force distribution and moment distribution will now be described. The fibers 35 in the plates 6, 7, 8, and 9 are capable to take up substantial axial forces $P_A$ which must be transmitted from the rotor blades through the plates 6, 7, 8, and 9 to the rotor head. These forces are represented by a simplified force distribution of tension forces 36 extending at a slanting angle relative to the rotor blade axis A and which forces must be taken up by the plates 6 and 7, or 8 and 9. The occurring flapping bending moments and the lagging bending moments $M_d$ are effective at the rotor blade root 2a as tension forces 36 and as pressure forces 37 as illustrated in FIG. 7. Due to the biasing caused in the fibers of the plates by the axial forces $P_A$, the plates 6, 7, 8, and 9 are enabled to take up the pressure forces 37 in the form of tension forces 36. As mentioned, the pressure forces 37 are caused by the bending moments. The resulting forces are illustrated in FIG. 8 by superimposing the forces shown in FIGS. 6 and 7. The substantial length of the plates 6, 7, 8, and 9 even further improves the capability of taking up the pressure forces 37 in the form of tension forces 36. Another advantage of the structure of the invention is seen in that the plates, since they merge from different directions in the rotor blade axis A, are capable to take up, by way of tension forces, those forces which extend radially between the rotor blades and the rotor head. Yet another advantage of the invention is seen in the two differing angles α and β. The plates have relative to the direction of forces resulting from a lagging bending moment, a relatively small angle β and a relatively larger angle α relative to the direction of forces resulting from a flapping bending moment. Thus, it is possible to support the rotor blades relative to the rotor head so that the structure is especially resistant to lagging bending while being simultaneously somewhat less stiff against bending relative to flapping bending moments.

Furthermore, the plates 6, 7, 8, and 9 are protected against unpermissible bending loads and sharp buckling by the radii of curvature 28 into which the slots 26 merge as best seen in FIG. 3. Such protection against overloads is especially effective when bending moments about the rotor blade axis occur simultaneously with tension loads. Thus, the structure according to the invention utilizes efficiently the advantages of fiber reinforced compound materials which are frequently capable of taking up substantially larger forces in the tension direction than in the pressure direction, thus, a denting of the plates 6, 7, 8, and 9 is prevented.

Figure 10:
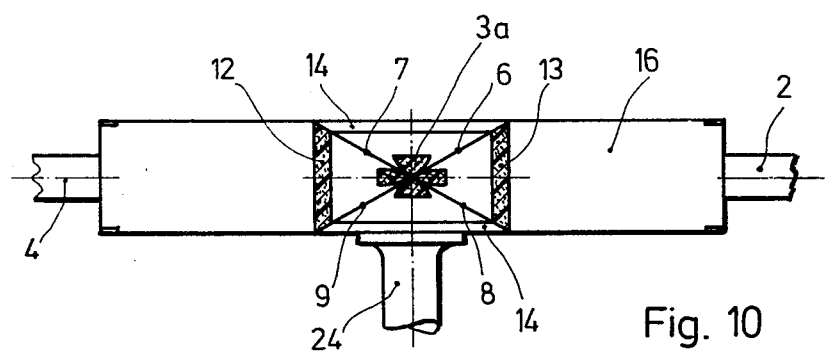
FIG. 10 is a sectional view along section line 10—10 in FIG. 9.
Figure 9:
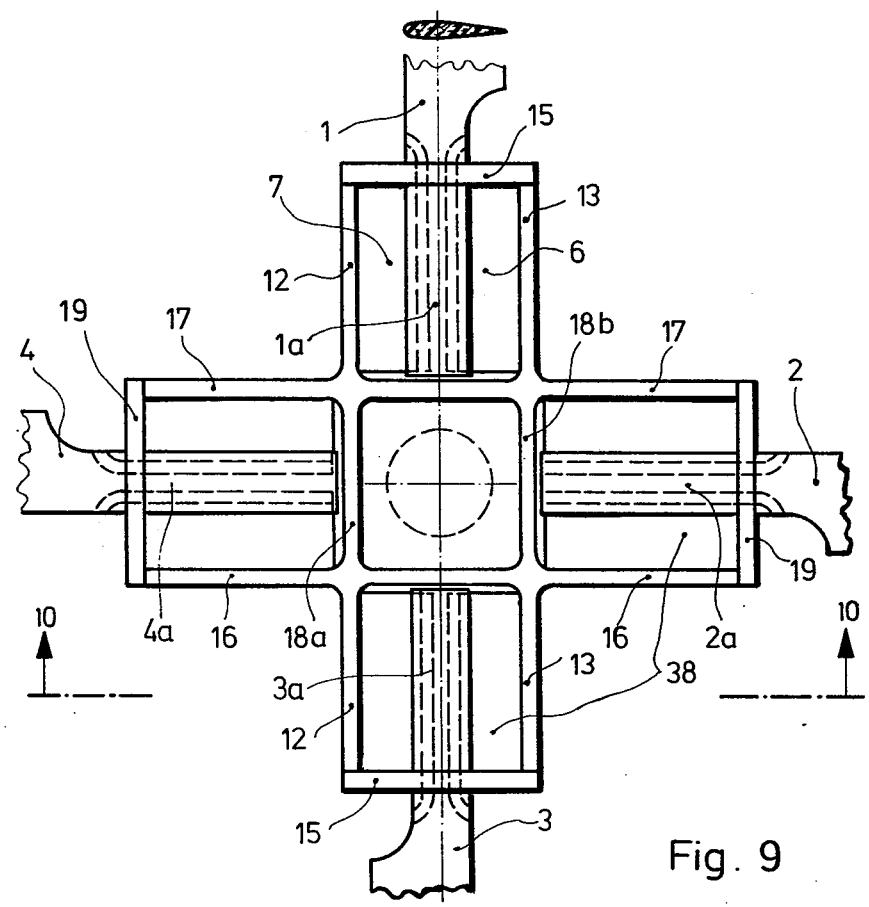
FIG. 9 is a top plan view of a second embodiment according to the invention, wherein the rotor blades are arranged in the same plane.

FIGS. 9 and 10 illustrate the four rotor blades 1 to 4, arranged in one plane, whereby the respective bars, bridging elements, and spacing members form a securing box 38 for each rotor blade, said securing box enclosing the rotor blade roots as well as the plates. These securing boxes are interconnected at their corners in such a manner that the bars are aligned with each other in the longitudinal direction, whereas the bridging elements extend across the bars so that the latter extend through the bridging elements. For example, the bars 13 are aligned with the bridging elements 18b and the bars 12 are aligned with the bridging elements 18a, whereas the bars 17 extend perpendicularly thereto.

Figure 12:
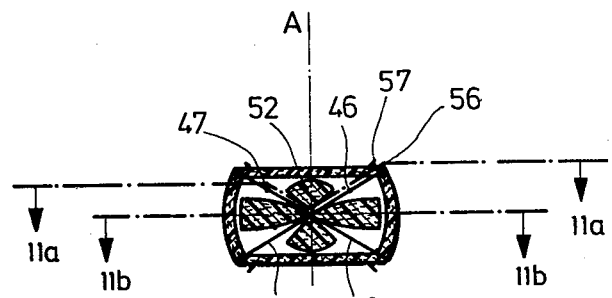
FIG. 12 is a sectional view along section line 12—12 in FIG. 11.
Figure 11:
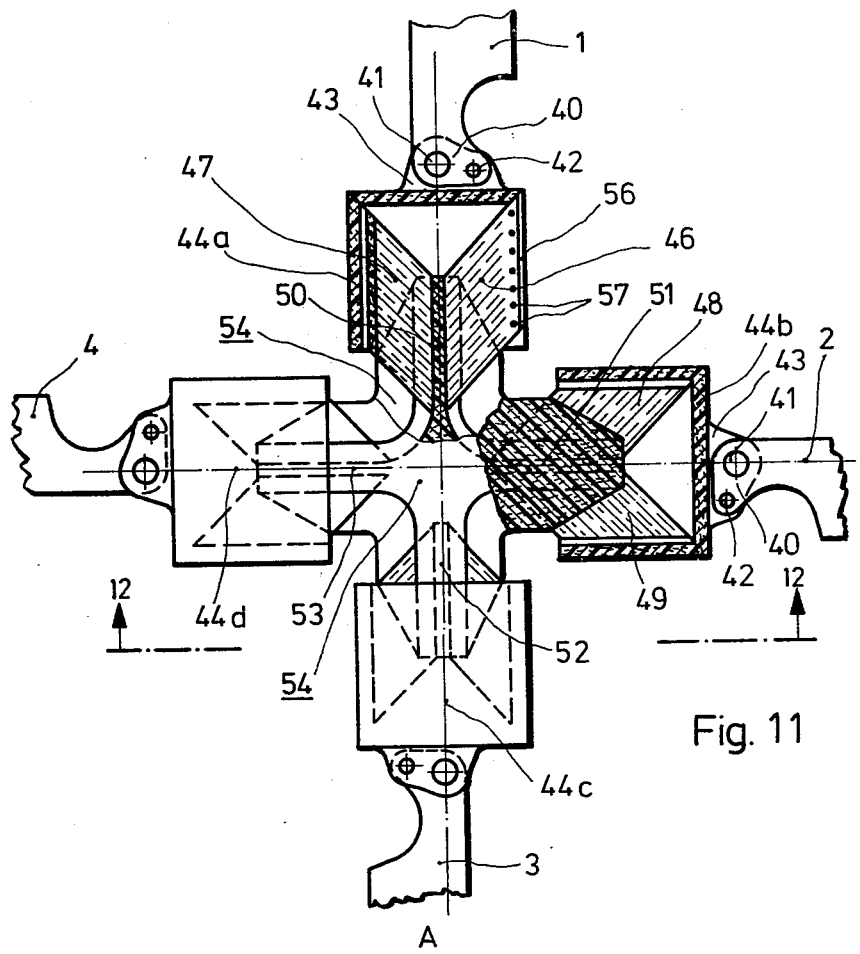
FIG. 11 illustrates, partially in section, a top plan view of a third embodiment according to the invention in which the rotor blade roots are interconnected to form a so-called cross head.

FIGS. 11 and 12 illustrate a further example embodiment of a rotor head according to the invention, comprising rotor blades arranged in a common plane. The rotor blades 1, 2, 3, and 4 are rigidly connected to cube shaped securing boxes 44 by means of bearing bosses 40 and 43 through which respective bolts 41 and 42 extend. It is also possible to construct the rotor blades and the securing boxes 44 as an integral unit. The plates 46, 47, 48, and 49 are inserted into the securing boxes 44, four of which are illustrated in FIG. 11 at 44a, 44b, 44c, and 44d. The plates 46, 47, 48, and 49 are also clamped in the rotor blade roots 50, 51, 52, and 53 of a cross-head 54.

The rotor blade roots 50 and 51 of FIG. 11 are sectioned in two different planes 11a—11a and 11b—11b as illustrated in FIG. 12. The section plane 11a—11a extends directly through the smallest cross sectional area of the rotor blade root 50 at the clamping slots for the plates 46 and 47. The right hand portion illustrates the connection of the plates 46 in the securing box 44a. The plate 46 is inserted into the slot 56 which is milled into the longitudinal edge of the securing box 44a. The plate 44 is further connected to the securing box 44a by means of screws 57. The other plates 47, 48 and 49 are connected in the same manner in respective slots and using corresponding screws not shown, whereby the slots extend along the longitudinal edges of the securing box 44a. The other plates are similarly connected.

The section 11b—11b shown in FIG. 12 extends precisely through the center of the securing box 44b and the rotor blade root 51. The contour of the plate 46, 47, 48, and 49 is a parallelogram in this embodiment of the invention. The operation for taking up the forces and moments from the rotor blades is the same as that described above with reference to FIGS. 1 to 8.

It is within the scope of the invention to employ the present teaching, which has been described with reference to a rotor head having four rotor blades, also in connection with rotors having fewer or more rotor blades, whereby the same structural elements would be employed.

In the light of the above disclosure, it will be appreciated that in a rotor head according to the invention, the elastic plates, for example, 6, 7, 8, and 9 provide the radial and axial bearing support for the rotor blades, thereby permitting the angular movements of the blades, while simultaneously taking up any lagging moments and any bending moments. The distribution of the bearing function onto several large plate surfaces makes possible a distributed introduction of the forces from the rotor blade to the rotor head without concentrating any force transmission in special hardware. Thus, the invention provides for a structural arrangement which is especially weight saving where fiber reinforced compound materials are used while simultaneously providing a structure which is very little, vulnerable to external influences.

It is a special advantage of the invention, where four plates are used for each rotor blade that those components which are subject to continuous loading are freely visible without any disassemblying and, thus may be continuously observed and checked.

The advantages of the invention may be accomplished in several embodiments. Thus, in one embodiment, the rotor blades may be located in the same plane and in another embodiment the rotor blades may be located in different planes. In any event, the bars, bridging elements, and spacer members are combined to form a securing box which holds the rotor blade root and the respective plates clamped in the rotor blade roots. Where the rotor blades comprise at least four blades arranged in pairs, one above the other, the members of a pair are connected by their respective securing box, whereby a common bridge structure is provided. In the third described embodiment the rotor blades are secured to said cube shaped securing boxes which are open toward the center of the rotor to receive the respective rotor blade roots at such open side or bottom. The rotor blade roots are combined to form a crosshead and the plates are inserted into such cross-head as illustrated.

Although the invention has been described with reference to specific example embodiments, it will be appreciated, that it is intended to cover all modifications and equivalents within the scope of the appended claims.

What is claimed is:

1. A rotor head having a rotational axis, for a hingeless rotor including rotor blades having a longitudinal axis and blade roots extending in said longitudinal axis of the rotor blades, flexible tethering means (6, 7, 8, 9), and a plurality of substantially rigid bars surrounding the longitudinal axis to form a securing box, said flexible tethering means connecting said substantially rigid bars and said rotor blades to the rotor head, said flexible tethering means comprising a number of flexible shear plates, and slot means in said blade roots, said flexible shear plates being inserted in said slot means, said flexible shear plates being arranged in such a manner that the planes defined by said flexible shear plates intersect each other in said longitudinal axis of said rotor blades.

2. The rotor head of claim 1, wherein said shear plates have a given thickness and length, said length being larger in the direction of said longitudinal rotor blade axis than said given thickness which is small relative to said length.

3. The rotor head of claim 1, wherein said number of flexible shear plates comprises four plates for each rotor blade root, each blade forming a first angle ($\alpha$) relative to a plane defined by the rotational axis of the rotor head and the longitudinal axis of the respective blade, and a second angle ($\beta$) relative to a plane extending perpendicularly through said rotational axis and through said longitudinal blade axis, said first angle ($\alpha$) being larger than said second angle ($\beta$).

4. The rotor head of claim 1, wherein said substantially rigid bars extend in pairs laterally to the respective flexible shear plates and in parallel to said longitudinal blade axis.

5. The rotor head of claim 4, further comprising bridging elements and spacer members, said bridging elements and spacer members being secured to said flexible shear plates, said bridging elements providing a stiffening relative to the center of the rotor head, said spacer members interconnecting respective ends of said flexible shear plates.

6. The rotor head of claim 5, wherein said rotor blades of a pair are arranged in a common plane, said bars, bridging elements, and spacer members of a respective rotor blade forming securing box means in which the rotor blade roots and the plates are contained.

7. The rotor head of claim 5, wherein said rotor blades comprise at least four blades arranged in two pairs, each pair being located in a different plane one above the other, and wherein the blades of a pair arranged opposite each other are provided with a common bridging element and with bars interconnecting the blades of a pair.

8. The rotor head of claim 7, further comprising releasable connecting means interconnecting the bars of one pair of rotor blades with the bars of the other pair of rotor blades, said rotor head further comprising means operatively arranged to permit tilting of one or both rotor blade pairs about the rotational axis.

9. The rotor head of claim 1, wherein said securing box has an open end facing toward said rotational axis, said rotor blades being secured to said box means, said flexible shear plates being inserted into said rotor blade roots, said rotor blade roots forming a cross-head and reaching with the respective plates into said securing box at said open end of the respective box.

10. The rotor head of claim 9, wherein said plates have the shape of a trapezoid, said securing box having internal slot means therein, said flexible shear plates being secured in said slot means and to said rotor blade roots.

11. The rotor head of claim 1, wherein said rotor blade roots have slot means therein for receiving and holding said flexible shear plates, said slot means extending to a point close to said longitudinal blade axis, said slot means having outwardly opening contours forming a funnel shape whereby a relatively short length of slot means for clamping the respective plate, merges into respective substantially circular curve portions.

12. The rotor head of claim 1, wherein said securing box for said flexible shear plates comprise in addition to said substantially rigid bars, spacer members and bridging elements capable of an elastic deformation whereby bending of said flexible shear plates is compensated by said elastic deformations.

13. The rotor head of claim 1, wherein said plates are made of fiber reinforced compound material said fibers extending substantially in parallel to each other in each plate, said fibers extending at a slanting angle relative to the longitudinal axis of said rotor blades, whereby the fibers in a pair of opposite plates extend in directions away from said longitudinal axis to form an acute angle ($\gamma$).

14. The rotor head of claim 13, wherein said fibers are subject to axial tension loads in response to axial forces and bending moments applied to the rotor blades, said bending moments causing tension and pressure forces, said axial tension loads biasing the fibers to such an extent that said pressure forces are compensated by the biasing and the forces resulting from said bending moments and said axial forces are tension forces only.

* * * * *